Dec. 9, 1969 C. R. FRASIER ET AL 3,483,521
PROGRAM REQUEST STORAGE AND CONTROL APPARATUS IN
A MULTIPROGRAMMED DATA PROCESSING SYSTEM
Filed May 13, 1966
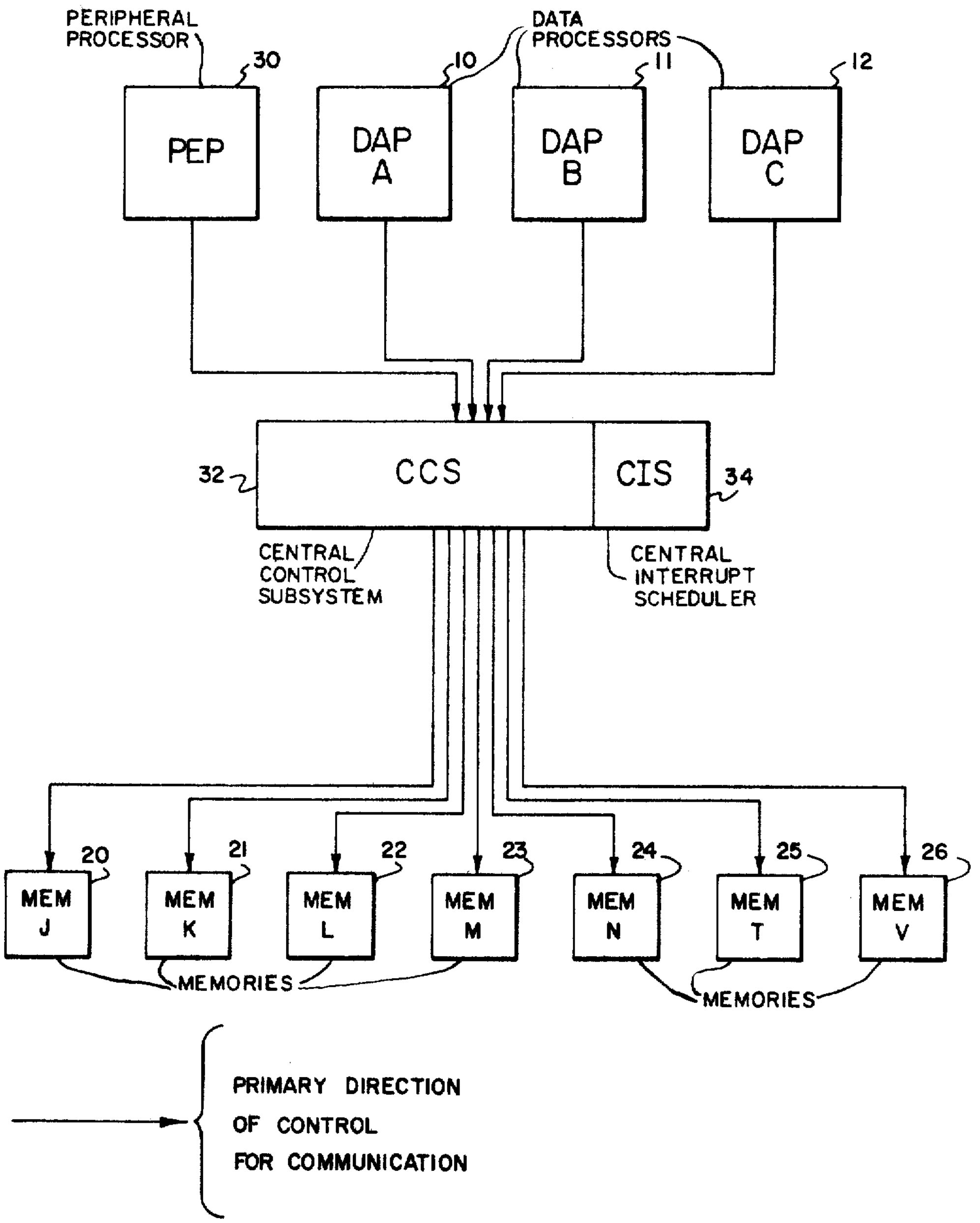
INVENTORS
C.R. FRASIER
L.A. HITTEL
J.R. HUDSON
L.L. RAKOCZI
D.L. SANSBURY
J.B. WIENER
BY
Louis P. Elbinger United States Patent Office 3,483,521
Patented Dec. 9, 1969

3,483,521

PROGRAM REQUEST STORAGE AND CONTROL APPARATUS IN A MULTIPROGRAMMED DATA PROCESSING SYSTEM

Carlton R. Frasier, Glendale, and Lorenz A. Hittel, Phoenix, Ariz., and James R. Hudson, Charlestown, Md., and Laszlo L. Rakoczi and David L. Sansbury, Phoenix, Ariz., and Jerome B. Wiener, Armonk, N.Y., assignors to General Electric Company, a corporation of New York Filed May 13, 1966, Ser. No. 550,037
Int. Cl. G11b *31/00;* G06f *13/00*
U.S. Cl. 340—172.5 12 Claims

ABSTRACT OF THE DISCLOSURE

A multiprogram data processing system is disclosed in which each data processor of the system produces a request signal upon encountering any one of a plurality of predetermined conditions. Each request signal identifies a program, the execution of which is required to resolve the encountered condition. A program storage member receives the request signals, stores indicia of such signals, and assigns programs corresponding to the indicia stored therein to data processors for execution in accordance with the priority allocated to each such program.

This invention relates to multicomputer and multiprogrammed systems and more particularly to apparatus for exercising management control of a multicomputer or multiprogrammed data processing system.

The multicomputer system is a data processing system comprising a plurality of data processors, one or more data storage units, and a plurality of input devices and output devices. The data processors process data by executing separate programs or program parts simultaneously. The data storage units store data to be processed, data which is the result of processing, and programs and program parts for controlling the processing operations of the data processors. The input devices supply programs, program parts, and data to be processed and the output devices receive and utilize processed data.

The multiprogrammed system is a data processing system wherein one or more data storage units store concurrently a plurality of independent programs or parts of such programs. A multiprogrammed system having but one data processor alternately executes the stored programs and program parts. The multicomputer system functions as a multiprogrammed system, wherein the plural data processors simultaneously execute respective ones of the plural stored programs and program parts.

Communication must be provided for the data processors to receive programs, program parts, and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs, program parts, and data to be processed to the data storage units from the input devices and to transfer processed data from the data storage units to the output devices.

The apparatus of the instant invention provides a portion of the management control for such multicomputer or multiprogrammed systems. Generally, management control of the multicomputer system described comprises expeditiously supplying data to be processed and the programs and program parts providing the required data processing functions to the data processors, and efficiently controlling the output devices to receive and utilize the processed data. Such management control is effected by providing and controlling all required communications between the processors and data storage units; by providing for the assignment of programs and program parts to data processors for execution in accordance with the required urgencies for execution of the different programs and program parts, the availability of the required input and output devices, the availability of the required data storage space in the data storage units, and the relative capabilities of the data processors for executing the different programs and program parts; by providing termination of the programs and program parts nearing completion and their replacement with other waiting programs; by providing assignment of specific data storage units for programs and program parts to be executed; by providing assignment of specific input and output devices for programs and program parts to be executed, and initiation and termination of data transfer operations by these devices; by providing the corrective functions required when program or data errors are detected by the processors, or when the processors become partially or totally inoperative; etc.

Each data processor of a multicomputer or multiprogrammed system executes a program or program part separately from the programs and program parts being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring a transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions, in turn, comprising an identification of a cell in the set.

The program part, generally, comprises a self-contained ordered set of instructions and data items requiring during execution no more than a predetermined fraction of the total data storage system, and, upon execution, performing but a portion of the complete data processing operation required of the parent program. Accordingly, a program comprises a plurality of program parts, although each program part is capable of independent execution by a data processor. Therefore, like each program, each program part requires a set of cells for storing and supplying data items to be processed by the program part, for receiving and storing data items which are the result of processing operations performed by the program part, and for storing the instructions of the program part.

Each input/output processor of a multicomputer or multiprogrammed system performs control and data transmission operations for its respective set of input and output devices separately from the operations being performed by the other input/output processors and separately from the programs and program parts being executed by the data processors. An input/output processor stores the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

In implementing the program control functions exercised by the management control it is desirable to provide unitary apparatus for effecting overall supervision of the programs and program parts executed by the system. Such program control apparatus should implement the function of assigning programs and program parts to data processors for execution in accordance with the required urgencies for execution of the different programs and program parts; the function of providing termination of the programs and program parts nearing completion and their replacement with other waiting programs; and the function of initiating corrective operations required when program or data errors are detected by the processors, or when the processors become inoperative. More specifically, the desired program control apparatus should provide for initiating the programs and program parts required to maintain continued effective and efficient operation of the data processing system upon the occurrence of one or more of the following exemplary conditions: the detection by a data processor of an instruction unintelligible thereto, which instruction requires translation or interpretation; the detection by a data processor of the imminent termination of a program or program part being executed thereby; the detection by a data processor of an error in a program or program part being executed thereby; the detection by a data processor, while executing a program or program part, of a requirement for a particular input or output device to initiate an input or output operation; the detection by an input/output processor of an error condition while the input/output processor is performing a data transmission operation between an input or output device and the data storage system; the detection by an input/output processor of the imminent termination of a data input or output operation being performed by a related input or output device; the detection by a data processor of the failure of a program or program part being executed thereby to terminate within a predetermined time; the detection of a "hardware" error by a data processor; etc.

Whenever a data processor or input/output processor detects one of the above-mentioned conditions, the detecting processor generates a signal set comprising a code. The signal set code either identifies the type of condition detected or the type of program or program part which must be initiated to maintain continued efficient and uninterrupted operation of the system for the particular condition detected. The above-mentioned program control apparatus should be able to recognize and interpret each of these signal sets and thereupon initiate execution by a data processor of the program or program part required by the corresponding condition. Furthermore, where more than one of these conditions occurs substantially simultaneously, the program control apparatus should be capable of assigning priorities to the required programs and program parts so as to initiate execution of the most urgent programs and program parts as early as possible.

Therefore, it is an object of this invention to provide improved management control apparatus for implementing a more effective and efficient multicomputer system.

Another object of this invention is to provide improved management control apparatus for implementing a more effective and efficient multiprogrammed system.

Another object of this invention is to provide improved management control apparatus for implementing the program control functions in a multiprogrammed system.

Another object of this invention is to provide unitary apparatus for effecting overall supervision of the programs and program parts executed in a multiprogrammed system.

Another object of this invention is to provide apparatus for centrally controlling the orderly initiation and termination of the program and program parts executed in a multiprogrammed system.

The foregoing objects are achieved, according to one embodiment of the instant invention, by providing in a multiprogrammed system, a unitary program control apparatus for performing the interrelated functions of recognizing and interpreting processor requests for the execution of identified programs and program parts, of storing indicia of such requests, of allocating priorities to the stored indicia, and of initiating sequentially operation of the data processors to execute the requested programs and program parts according to the priorities allocated to the corresponding stored indicia. The program control apparatus comprises a program request storage member including a plurality of bistable devices for representing respective ones of a plurality of different programs and program parts, each bistable device being operative in two stable states. As each data processor or input/output processor encounters a predetermined condition during execution of a respective sequence of operations, the processor transmits a signal set comprising a code representing a respective program or program part required for execution because of the condition encountered. The program control apparatus receives and decodes each such signal set and transfers to a designated first stable state the one of the bistable devices corresponding to the program or program part represented by the signal set.

A priority allocation means in the program control apparatus allocates different relative priorities to the bistable devices. The piority allocation means provides an identification of the one of all of the bistable devices operating at any time in the first stable state which has been allocated highest priority, such identification corresponding to the program or program part represented by the identified bistable device. Additionally, whenever one or more of the bistable devices is operating in the first stable state, the program control apparatus transmits a notification signal to the one of the data processors currently executing the program or program part considered to have lowest priority of the progams and pogram parts being executed.

When the notified data processor reaches a point which permits an orderly suspension of the sequence of operations of the program or program part it is executing, the data processor responds to the notification signal. Following such response, the program control apparatus transmits a signal group comprising a code representing the identification provided by the priority allocation means. The responding data processor receives the signal group, initiates retrieval of the corresponding program or program part from the data storage system, and commences execution of such program or program part. Additionally, following the response by the notified data processor the bistable device corresponding to the signal group transmitted is transferred to its second stable state.

Accordingly, the instant invention, by effecting unitary control of the functions required for initiating, substituting, interrupting, suspending and terminating programs and program parts, provides for more effective and efficient multicomputer and multiprogrammed data processing systems.

Certain portions of the apparatus herein disclosed are not of our invention, but are the inventions of:

J. P. Barlow, S. F. Aranyi, L. L. Rakoczi, and M. A. Torfeh, as defined by the claims of their application, Ser. No. 550,562, filed May 16, 1966;

J. E. Belt, L. A. Hittel, G. R. Hope, Jr. E. J. Porcelli, and L. L. Rakoczi, as defined by the claims of their application, Ser. No. 551,355, filed May 19, 1966;

S. F. Aranyi, J. P. Barlow, R. Barton, L. L. Rakoczi, and M. A. Torfeh, as defined by the claims of their application, Ser. No. 551,657, filed May 20, 1966;

J. P. Barlow, C. R. Jones, and J. L. Kerr, as defined by the claims of their application. Ser. No. 559,305, filed June 21, 1966;

W. W. Chu and N. R. Crain, as defined by the claims of their application, Ser. No. 559,497, filed June 22, 1966;

S. F. Aranyi, J. P. Barlow, E. J. Porcelli, L. L. Rakoczi, and M. A. Torfeh, as defined by the claims of their application, Ser. No. 568,343, filed July 27, 1966;

J. E. Belt, L. A. Hittel, and L. L. Rakoczi, as defined by the claims of their application, Ser. No. 612,560, filed Jan. 30, 1967;

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1967;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. 646,504, filed on June 16, 1967; all such applications being assigned to the assignee of the present application.

Description of drawings

The invention will be described with reference to the acompanying drawings, wherein:

FIGURE 1 is ablock diagram of a Multicomputer Data Processing System to which the instant invention is applicable.

For a complete description of FIGURE 1 and of our invention, reference is made to U. S. Patent No. 3,444,525 entitled "Centrally Controlled Multicomputer System" by Jesse P. Barlow et al., which is assigned to the assignee of the present invention. More particularly, attention is directed to FIGURES 2–110 of the drawings and to the specification beginning at column 8, line 4, and ending at column 173, line 9, inclusive, of U.S. Patent No. 3,444,525 which are incorporated herein by reference and made a part hereof as if fully set forth herein.

What is claimed is:

1. A data processing system comprising: a plurality of data processors for executing respective programs independently, each of said processors providing a request signal upon reaching any one of a plurality of predetermined conditions during the execution of a program, each such request signal corresponding to a specific program for resolving the condition encountered by the processor providing the request signal; a program request storage member coupled to each of said processors to receive said request signals, said program request storage member adapted to store indicia corresponding to requests represented by received request signals; and means responsive to said indicia for controlling a processor to execute the program corresponding to the request signal received by said program request storage member.

2. A data processing system comprising: a plurality of data processors for executing independently respective program parts, each of said processors providing a request signal set upon reaching any one of a plurality of predetermined conditions during the execution of a program, each such request signal set corresponding to a specific program for resolving the condition encountered by the processor providing the request signal; a program request storage member coupled to each of said processors to receive said request signal sets, said program request storage member adapted to store indicia corresponding to requests represented by received request signal sets; and means responsive to said indicia for controlling a processor to execute the program corresponding to the request signal sets received by said program request storage member.

3. A data processing system comprising: a plurality of data processors for executing respective program parts independently, each of said processors providing a request signal set upon reaching any one of a plurality of predetermined conditions during the execution of a program part, each of said signal sets representing a specific program part required to be executed when a data processor encounters the corresponding condition, a program request storage member coupled to all of said processors to receive request signal sets provided by said processor and adapted to store indicia corresponding to the signal sets received, means responsive to said stored indicia for generating notification signals, each such notification signal notifying a selected data processor that it has been selected to execute a program corresponding to the indicia stored in the program request storage member, and means for transmitting the notification signal to the selected processor, the selected processor responding to said notification signal by initiating execution of the program part corresponding to the stored indicia.

4. A data processing system comprising: a plurality of data processors for executing respective program parts independently, each of said processors providing a request signal set upon reaching any one of a plurality of predetermined conditions during the execution of a program part, each of said signal sets representing a specific program part required to be executed when a data processor encounters the corresponding condition; a program request storage member coupled to all of said processors to receive request signal sets provided by said processor and adapted to store indicia corresponding to the signal sets received, means responsive to said stored indicia for generating notification signals, each such notification signal notifying a selected data processor that it has been selected to execute a program corresponding to the indicia stored in the program request storage member, and means for transmitting the notification signal to the selected processor, means responsive to said stored indicia for delivering a program parts identification signal corresponding to said stored indicia to said selected data processor, the selected processor responding to said notification signal and program parts identification signal by initiating execution of the program part corresponding to said program parts identification signal.

5. A data processing system comprising: a plurality of data processors for executing respective program parts independently, each of said processors upon the occurrence of any one of a plurality of predetermined conditions during the execution of a program produces a request signal identifying the program part required to resolve the condition encountered by the processor, a program request storage member coupled to all of said processors to receive request signals produced by said processors and being adapted to store indicia corresponding to the request signals, priority allocation means for allocating respective priority to the indicia stored in said request storage member; and means responsive to said priority allocation means for controlling one of said processors to execute the program part corresponding to the one of the stored indicia allocated highest priority by the priority allocation means.

6. A data processing system comprising: a plurality of data processors for executing independently respective program parts, each of said processors providing a request signal set upon reaching one of a plurality of predetermined conditions during the execution of a program part, each of said signal sets corresponding to a program part which must be executed when said conditions reach in order to remedy it; a program request storage member coupled to all of said processors to receive said request signal sets, said request storage member being adapted to store indicia corresponding to the program part represented by each signal set received; priority allocation means for allocating priorities to said stored indicia; means responsive to said stored indicia for generating a notification signal notifying a designated one of said data processors that it has been selected to execute a program part; means for transmitting such notification signal to the designated processor; and means responsive to said priority allocation means for delivering a program part signal group representing the program part allocated highest priority to the designated processor, whereby the designated processor executes the program part allocated highest priority.

7. The data processing system of claim 6 in which said system further comprises means for removing the one of said stored indicia from said request storage member following delivery of said program part signal group to said designated processor.

8. A data processing system comprising: a plurality of data processors for independently executing respective program parts, said program parts being divided into classes, each of said processors providing a request signal set upon reaching any one of a plurality of predetermined conditions during the execution of one of said program parts, each of which condition requires the execution of a program part of a given class to correct, each signal set produced by a data processor encountering one of said conditions representing the class of program parts required to be executed to correct such condition; a program request storage member coupled to all of said processors to receive each request signal set, said request storage member comprising a plurality of bistable devices with a bistable device corresponding to each class of program parts, each of said bistable devices being operative in two stable states, each bistable device transferring to its first stable state upon the application of a request signal set corresponding to said bistable device; and means responsive to each of said bistable devices being in its first stable state for controlling a processor to execute a program part of the class corresponding to said bistable device.

9. A data processing system comprising: a data processor and an input-output processor, each independently executing respective program parts, said program parts being divided into classes, each of said processors providing a request signal set upon reaching any one of a plurality of predetermined conditions during the execution of one of said program parts, each of which condition requires the execution of a program part of a given class to correct, each such signal set produced by a data processor representing the class of program parts required to be executed to correct the corresponding condition; a program request storage member coupled to all of said processors to receive each request signal set, said request storage member comprising a plurality of bistable devices with a bistable device corresponding to each class of program parts, each of said bistable devices being operative in two stable states, each bistable device transferring to its first stable state upon the application of a request signal set corresponding to said bistable device; a priority being allocated to each of said bistable devices; and means responsive to the one of the bistable devices being in its first stable state and allocated highest priority for controlling a processor to execute a program part of the class corresponding to the bistable device in its first stable state and allocated the highest priority.

10. A data processing system comprising: a plurality of data processors for executing independently respective program parts, each of said processors providing a request signal set upon reaching one of a predetermined plurality of conditions during execution of one of said program parts, each of said request signal sets representing a class of program parts corresponding to the condition of the processor producing a request signal set, which class of program parts must be executed to alleviate said condition; a program request storage member comprising a plurality of bistable devices, each of said bistable devices corresponding to a respective class of program parts, each of said bistable devices being operative in two stable states, said request storage member being coupled to all of said processors to receive each one of said request signal sets and being adapted to transfer to a first stable state the one of said bistable devices corresponding to the program parts class represented by each signal set; priority allocation means responsive to the bistable devices being in their first stable state for allocating respective priorities thereto; means responsive to said bistable devices operating in said first stable state and allocated the highest priority for generating a notification signal denoting the storage of a request signal set by said request storage member and for generating a program parts class signal denoting the class of program parts corresponding thereto; means for transmitting said notification signal and said program parts class signal to one of said processors, said notification signal and program parts class signal causing said one processor to execute the class of program parts corresponding to said program parts class signal.

11. The data processing system of claim 10 further including means for transferring to its second stable state the one of said bistable devices corresponding to said program parts class signal following delivery of said program parts class signal to said one of said processors.

12. The data processing system of claim 11 in which one of said plurality of data processors is an input-output processor.

References Cited

UNITED STATES PATENTS

| | | | |
|---|---|---|---|
| 3,229,260 | 1/1966 | Falkoff | 340—172.5 |
| 3,242,467 | 3/1966 | Lamy | 340—172.5 |
| 3,283,308 | 11/1966 | Klein et al. | 340—172.5 |
| 3,286,239 | 11/1966 | Thompson et al. | 340—172.5 |
| 3,287,705 | 11/1966 | Rosenblatt et al. | 340—172.5 |
| 3,289,168 | 11/1966 | Walton et al. | 340—172.5 |
| 3,297,999 | 1/1967 | Shimabukuro | 340—172.5 |
| 3,312,951 | 4/1967 | Hertz | 340—172.5 |
| 3,333,252 | 7/1967 | Shimabukuro | 340—172.5 |
| 3,346,851 | 10/1967 | Thornton et al. | 340—172.5 |
| 3,386,083 | 5/1968 | Geller | 340—172.5 |

JOHN P. VANDENBURG, Primary Examiner